(12) United States Patent
Sakamoto et al.

(10) Patent No.: US 12,535,332 B2
(45) Date of Patent: Jan. 27, 2026

(54) VEHICLE SITUATION ESTIMATION SYSTEM, VEHICLE SITUATION ESTIMATION METHOD, AND STORAGE MEDIUM

(71) Applicant: TOYOTA JIDOSHA KABUSHIKI KAISHA, Toyota (JP)

(72) Inventors: Shoji Sakamoto, Shizuoka-ken (JP); Kazumi Tsuchiya, Gotemba (JP); Makoto Matsushita, Ichinomiya (JP); Takeshi Takemoto, Nagoya (JP); Shunsuke Sagara, Nisshin (JP); Hideaki Shiraishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 18/468,940

(22) Filed: Sep. 18, 2023

(65) Prior Publication Data

US 2024/0192014 A1   Jun. 13, 2024

(30) Foreign Application Priority Data

Dec. 9, 2022 (JP) ................................ 2022-197532

(51) Int. Cl.
*G01C 21/36* (2006.01)
*G07C 5/00* (2006.01)

(52) U.S. Cl.
CPC ......... *G01C 21/3691* (2013.01); *G07C 5/008* (2013.01)

(58) Field of Classification Search
CPC ............................ G07C 5/008; G01C 21/3691

USPC ......................................................... 701/31.4
See application file for complete search history.

(56) References Cited

U.S. PATENT DOCUMENTS

| | | | | |
|---|---|---|---|---|
| 2014/0002277 | A1* | 1/2014 | Fulger | H04W 4/029 340/905 |
| 2018/0283895 | A1* | 10/2018 | Aikin | G01C 21/3415 |
| 2020/0189527 | A1 | 6/2020 | Kusama et al. | |

FOREIGN PATENT DOCUMENTS

| | | |
|---|---|---|
| JP | 2016-085080 A | 5/2016 |
| JP | 2017-528772 A | 9/2017 |
| JP | 2020-094956 A | 6/2020 |
| WO | 2015/189375 A2 | 12/2015 |

\* cited by examiner

*Primary Examiner* — Navid Z. Mehdizadeh
*Assistant Examiner* — Vincent Feng
(74) *Attorney, Agent, or Firm* — SoraIP, Inc.

(57) ABSTRACT

The vehicle situation estimation system includes: a vehicle weather information acquisition unit configured to acquire vehicle weather information on weather around a vehicle from an artificial satellite; a vehicle external information acquisition unit and a vehicle internal information acquisition unit that are configured to acquire vehicle travel state information from an external sensor and an internal sensor that are mounted on the vehicle and that are configured to detect a travel state of the vehicle; and an actual weather condition information generation unit configured to generate actual weather condition information indicating a weather condition around a road on which the vehicle travels based on the vehicle weather information and the vehicle travel state information.

5 Claims, 6 Drawing Sheets

VEHICLE SITUATION ESTIMATION SYSTEM, VEHICLE SITUATION ESTIMATION METHOD, AND STORAGE MEDIUM

CROSS-REFERENCE TO RELATED APPLICATION

This application claims priority to Japanese Patent Application No. 2022-197532 filed on Dec. 9, 2022, incorporated herein by reference in its entirety.

BACKGROUND

1. Technical Field

The present disclosure relates to a vehicle situation estimation system, a vehicle situation estimation method, and a storage medium.

2. Description of Related Art

Japanese Unexamined Patent Application Publication No. 2016-85080 (JP 2016-85080 A) discloses an invention related to a bypass route search system. This bypass route search system acquires weather information of a range including a planned travel route of a vehicle and determines based on the weather information whether there is a place where it is difficult for the vehicle to pass due to a flooded road etc.

SUMMARY

In the related art described in JP 2016-85080 A, the weather information is acquired from a weather prediction information database. This weather information is just a prediction, and there is room for improvement in terms of improving the accuracy of various kinds of information on the weather around the vehicle.

The present disclosure provides a vehicle situation estimation system, a vehicle situation estimation method, and a storage medium that can improve the accuracy of various kinds of information on the weather around a vehicle.

A vehicle situation estimation system according to a first aspect of the present disclosure includes: a vehicle weather information acquisition unit configured to acquire vehicle weather information on weather around a vehicle from an artificial satellite;
   a vehicle travel information acquisition unit configured to acquire vehicle travel state information from a sensor mounted on the vehicle, the sensor being configured to detect a travel state of the vehicle; and an actual weather condition information generation unit configured to generate, based on the vehicle weather information and the vehicle travel state information, actual weather condition information indicating a weather condition around a road on which the vehicle travels.

According to the first aspect, the vehicle weather information acquisition unit acquires the vehicle weather information on the weather around the vehicle from the artificial satellite.

Information on the weather that can be acquired from an artificial satellite is limited to information that can be observed from the artificial satellite such as the position of rain clouds. Therefore, for example, there may be a situation where rain is not falling around the vehicle even if the vehicle is located immediately below rain clouds based on the observation from the artificial satellite. That is, it is considered difficult to estimate the actual weather around the vehicle only by the information obtained from the artificial satellite.

On the other hand, since the travel state of the vehicle changes considerably due to the weather such as rain and snow, it is conceivable to estimate the weather around the vehicle by observing the travel state of the vehicle. However, if there is no information on the position of rain clouds etc., it is difficult to determine whether the travel state of the vehicle is due to the weather.

In the present disclosure, the sensor mounted on the vehicle detects the travel state of the vehicle, and the vehicle travel information acquisition unit acquires the vehicle travel state information from the sensor. Based on the vehicle weather information and the vehicle travel state information, the actual weather condition information generation unit generates the actual weather condition information indicating the weather condition around the road on which the vehicle travels. Therefore, in the present disclosure, the weather condition around a predetermined vehicle can be acquired by, for example, sharing the actual weather condition information between or among a plurality of vehicles.

In the vehicle situation estimation system according to the first aspect, the vehicle travel information acquisition unit may be configured to acquire, as the vehicle travel state information, an image or video of surroundings of the vehicle captured by an imaging unit, the imaging unit being configured to capture an image of the surroundings of the vehicle. The vehicle situation estimation system may further include: a travel route setting unit configured to set a travel route of the vehicle; a local weather information acquisition unit configured to acquire local weather information of a predetermined area from the artificial satellite; and a weather condition estimation unit configured to estimate, when the predetermined area is included in the travel route of a second vehicle, weather around the second vehicle when the second vehicle travels in the predetermined area, based on the actual weather condition information of a first vehicle that travels in the predetermined area, the local weather information, and the travel route of the second vehicle.

According to the above, the vehicle travel information acquisition unit acquires, as the vehicle travel state information, an image or video of the surroundings of the vehicle captured by the imaging unit configured to capture an image of the surroundings of the vehicle. Therefore, for example, when rain is falling around the vehicle, the actual weather condition information is generated based on an image of the rain falling.

In the above aspect, the travel route setting unit sets the travel route of the vehicle. The local weather information acquisition unit acquires the local weather information of the predetermined area from the artificial satellite.

In the present disclosure, the weather condition estimation unit estimates, when the predetermined area is included in the travel route of a second vehicle, weather around the second vehicle when the second vehicle travels in the predetermined area, based on the actual weather condition information of a first vehicle that travels in the predetermined area, the local weather information, and the travel route of the second vehicle. That is, according to the present disclosure, the accuracy of estimation of the weather around the vehicle can be ensured by sharing the actual weather condition information between or among the plurality of vehicles.

In the vehicle situation estimation system according to the first aspect, the vehicle travel information acquisition unit may be configured to acquire wheel speed time-series information of the vehicle as the vehicle travel state information. The vehicle situation estimation system may further include: a local weather information acquisition unit configured to acquire local weather information of a predetermined area from the artificial satellite; and a road condition estimation unit configured to estimate a road surface condition of the road on which the vehicle travels, based on the wheel speed time-series information of the vehicle that travels in the predetermined area and the local weather information.

According to the above, the local weather information acquisition unit acquires the local weather information of the predetermined area from the artificial satellite.

In order to cause the vehicle to travel safely, it is preferable to be able to grasp the condition of a road surface on which the vehicle travels in the predetermined area. In this regard, since the condition of the road surface is affected by the weather, it is also possible to estimate the condition of the road surface on which the vehicle travels in the predetermined area from the local weather information of the predetermined area. However, information that can be acquired from an artificial satellite is limited to information that can be observed from the artificial satellite such as the position of rain clouds. It is therefore considered difficult to estimate the condition of the road surface around the vehicle only by the information obtained from the artificial satellite.

In this regard, for example, a change in wheel speed of the vehicle when the vehicle travels on a wet road surface is different from a change in wheel speed of the vehicle when the vehicle travels on a dry road surface. Therefore, it is conceivable to estimate the condition of the road surface around the vehicle from the change in wheel speed.

In the present disclosure, the vehicle travel information acquisition unit acquires the wheel speed time-series information of the vehicle as the vehicle travel state information. The road condition estimation unit estimates the road surface condition of the road on which the vehicle travels, based on the wheel speed time-series information of the vehicle that travels in the predetermined area and the local weather information. Accordingly, in the present disclosure, it is possible to improve the accuracy of the estimation of the road surface condition.

In the vehicle situation estimation system according to the first aspect of the present disclosure, the vehicle travel information acquisition unit may be configured to acquire acceleration information, steering amount information, accelerator operation amount information, and brake operation amount information of the vehicle as the vehicle travel state information, and the road condition estimation unit may be configured to estimate a friction condition of a road surface of the road based on vehicle location information and the vehicle travel state information, the vehicle location information being information based on a location signal of the vehicle sent from the artificial satellite.

According to the above, the vehicle travel information acquisition unit acquires the acceleration information, steering amount information, accelerator operation amount information, and brake operation amount information of the vehicle as the vehicle travel state information.

When the driving force of tires of the vehicle is properly transmitted to the road surface, acceleration of the vehicle and thus displacement of the vehicle tend to change in proportion to the steering amount, accelerator operation amount, and brake operation amount of the vehicle.

On the other hand, when the driving force of the tires of the vehicle is not properly transmitted to the road surface, that is, when the tires are slipping, the steering amount, accelerator operation amount, and brake operation amount of the vehicle tend not to be proportional to the acceleration of the vehicle and the displacement of the vehicle.

In the present disclosure, the road condition estimation unit estimates the friction condition of the road surface of the road based on both the vehicle location information that is based on the location signal of the vehicle sent from the artificial satellite and the vehicle travel state information. Accordingly, in the present disclosure, it is possible to further improve the accuracy of the estimation of the road surface condition.

A vehicle situation estimation method according to a second aspect of the present disclosure includes: acquiring vehicle weather information on weather around a vehicle from an artificial satellite; acquiring vehicle travel state information from a sensor mounted on the vehicle, the sensor being configured to detect a travel state of the vehicle; and generating, based on the vehicle weather information and the vehicle travel state information, actual weather condition information indicating a weather condition around a road on which the vehicle travels.

A storage medium according to a third aspect of the present disclosure stores a vehicle situation estimation program that causes a computer to perform processing of causing at least one processor to: acquire vehicle weather information on weather around a vehicle from an artificial satellite; acquire vehicle travel state information from a sensor mounted on the vehicle, the sensor being configured to detect a travel state of the vehicle; and generate, based on the vehicle weather information and the vehicle travel state information, actual weather condition information indicating a weather condition around a road on which the vehicle travels.

As described above, the vehicle situation estimation system, the vehicle situation estimation method, and the storage medium according to the present disclosure are advantageous in that it is possible to improve the accuracy of various kinds of information on the weather around the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
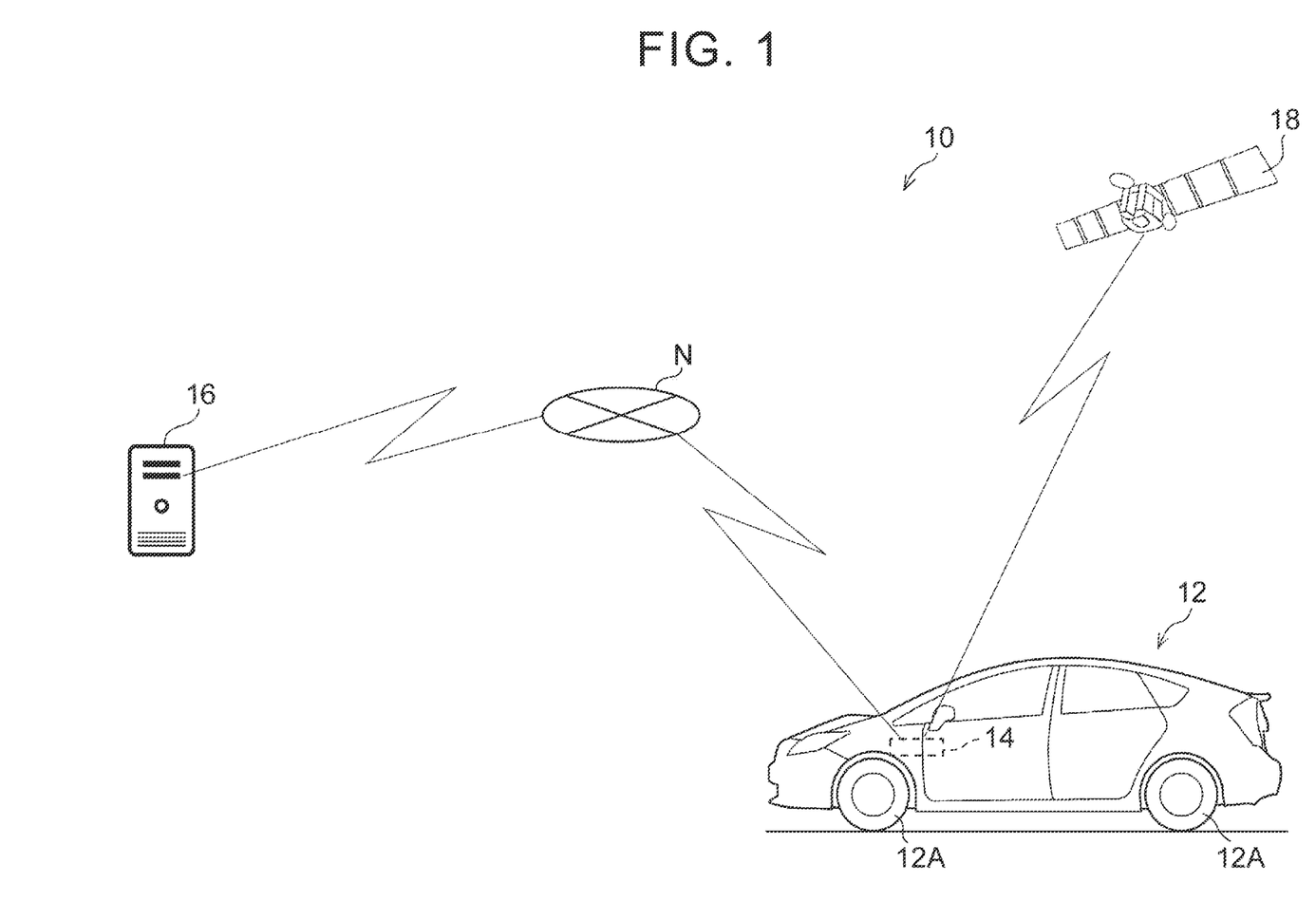
FIG. 1 is an image diagram schematically showing a configuration of a vehicle situation estimation system according to the present embodiment.

Hereinafter, an example of an embodiment of a vehicle situation estimation system according to the present disclosure will be described with reference to FIGS. 1 to 6. As illustrated in FIG. 1, the "vehicle situation estimation system 10" according to the present embodiment includes a vehicle control device 14, a data server 16, and an "artificial satellite 18" mounted on each of a plurality of "vehicles 12."

Figure 2:
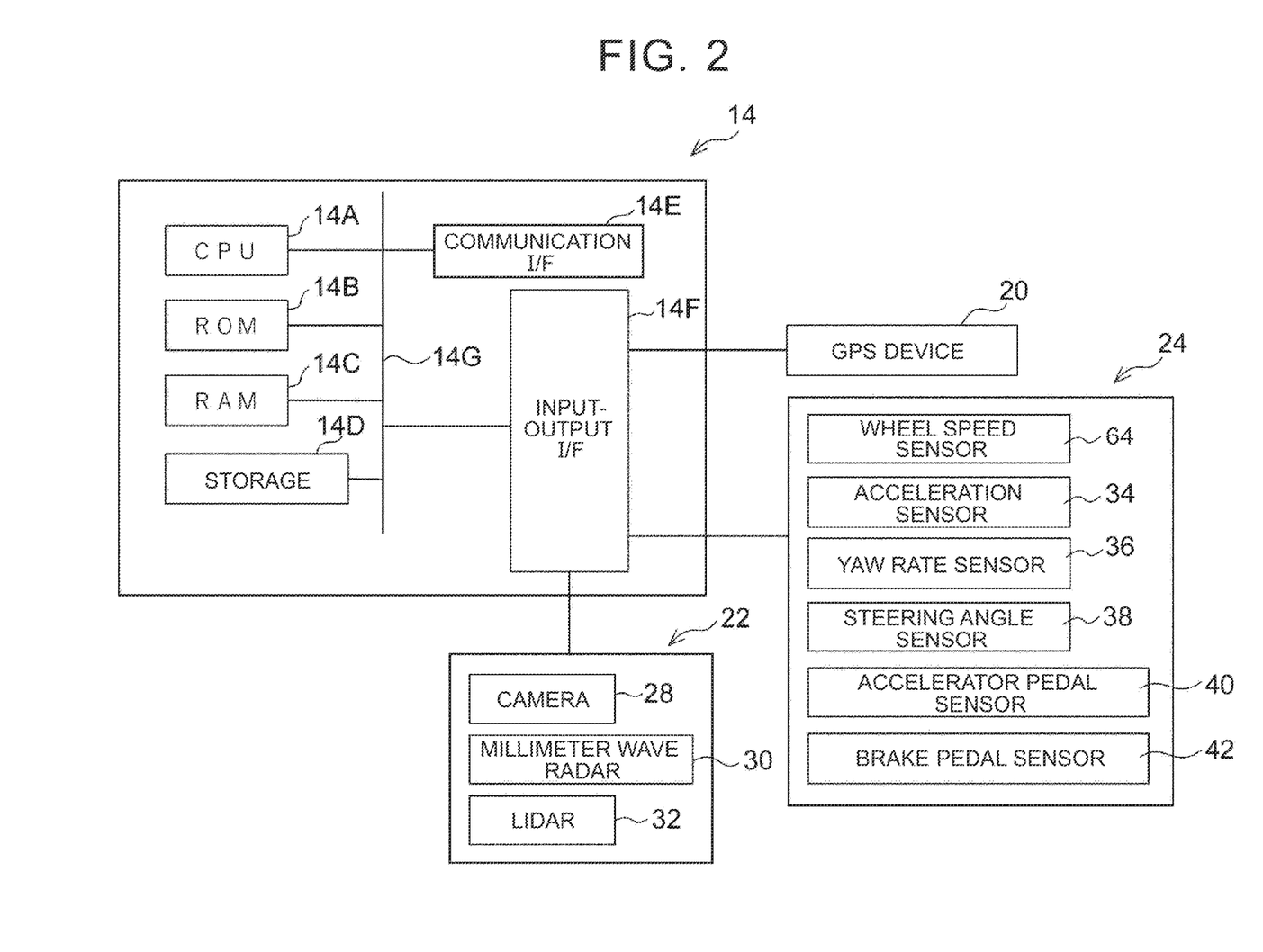
FIG. 2 is a block diagram illustrating a hardware configuration of a vehicle control device and a relationship with peripheral devices thereof in the vehicle situation estimation system according to the present embodiment.

As illustrated in FIG. 2, the vehicle control device 14 includes a "Central Processing Unit (CPU) 14A" as a processor, a Read Only Memory (ROM) 14B, Random Access Memory (RAM) 14C, a storage 14D, a communication interface (I/F) 14E, and an input/output I/F 14F. CPU 14A, ROM 14B, RAM 14C, the storage 14D, the communication I/F 14E, and the input/output I/F 14F are communicably connected to each other via a bus 14G.

CPU 14A is a central processing unit and can execute various programs. Specifically, CPU 14A can read a program from ROM 14B and execute the program using RAM 14C as a working area. Then, the execution program stored in ROM 14B is read and executed by CPU 14A, so that the vehicle control device 14 can perform various functions as described later. The ROM 14B is an example of a storage medium.

More specifically, ROM 14B stores various programs and various data. On the other hand, RAM 14C can temporarily store programs/data as a working area.

The storage 14D includes Hard Disk Drive (HDD) or Solid State Drive (SSD), and stores various programs including an operating system and various types of data such as map information. As will be described later, the storage 14D can store information sent from the artificial satellite 18 and information acquired from various devices configured to communicate with the vehicle control device 14.

The communication I/F 14E serves as an interface used for connecting the vehicle control device 14 to the network N and the artificial satellite 18. For the interface, for example, communication standards such as Ethernet (registered trademark), fiber-distributed data interface (FDDI), and Wi-Fi (registered trademark) are used. The communication I/F 14E may include a radio device. The communication I/F 14E communicates with the data server 16 via the network N, so that various types of data can be sent and received to and from the data server 16. In addition, the communication I/F 14E is configured to receive images and the like captured by a camera (not shown) mounted on the satellite 18 by communicating with the satellite 18. Various types of data acquired from the data server 16 and the satellite 18 are stored in a storage 14D.

The input/output I/F 14F serves as an interface for the vehicle control device 14 to communicate with the respective devices mounted on the vehicle 12. The vehicle control device 14 is connected to various devices described later via an input/output I/F 14F so that they can communicate with each other. These devices may be directly connected to the bus 14G.

Equipment connected to the vehicle control device 14 includes a Global Positioning System (GPS) device 20, an "external sensor 22" and an "internal sensor 24" as sensors.

GPS device 20 includes an antenna (not shown) for receiving a location signal of the vehicle 12 from the satellite 18, and is configured to measure the current location of the vehicle 12. The location data of the vehicles 12 measured by GPS device 20 is temporarily stored in the storage 14D. That is, the artificial satellite 18 also functions as a GPS satellite.

The external sensor 22 is a sensor group used for detecting the surroundings of the vehicle 12 during traveling of the vehicle 12. The external sensor 22 includes a "camera 28" as an imaging unit that captures an image of a predetermined range around the vehicle 12, a millimeter wave radar 30 that transmits a probe wave to the predetermined range, a lidar Laser Imaging Detection and Ranging (LiDAR) 32 that scans the predetermined range, and the like. In addition, the data acquired by the external sensor 22, such as images and videos by cameras, is stored in a storage 14D.

The internal sensor 24 is a group of sensors used for detecting the travel state of the vehicle 12, and includes a wheel speed sensor 64, an acceleration sensor 34, a yaw rate sensor 36, a steering angle sensor 38, an accelerator pedal sensor 40, a brake pedal sensor 42, and the like. The data acquired by the internal sensor 24 is stored in the storage 14D.

Next, a functional configuration of the vehicle control device 14 will be described with reference to FIG. 4. The vehicle control device 14 reads out the execution program stored in ROM 14B by CPU 14A and executes the execution program, thereby functioning as an aggregate of the communication unit 44, the "vehicle weather information acquisition unit 46", the "vehicle external information acquisition unit 48" as the vehicle travel information acquisition unit, the "vehicle internal information acquisition unit 50" as the vehicle travel information acquisition unit, the "travel route setting unit 52", and the "actual weather condition information generation unit 54".

The communication unit 44 is configured to send and receive various kinds of information to and from the data server 16 and the artificial satellite 18.

The vehicle weather information acquisition unit 46 is configured to acquire vehicle weather information related to weather around the vehicle 12 from the artificial satellite 18. Specifically, the vehicle weather information acquisition unit 46 sends a coordinates signal of the vehicle 12 based on the location information of the vehicle 12 measured by GPS device 20 to the artificial satellite 18 via the communication unit 44. When receiving the coordinate signal from the vehicle 12, the satellite 18 sends satellite image data around the vehicle 12, that is, the image data of clouds in the sky above the vehicle 12, and the like to the communication unit 44, and the vehicle weather information acquisition unit 46 acquires the satellite image data as the vehicle weather information. That is, in the present embodiment, the artificial satellite 18 also functions as a weather satellite.

The vehicle external information acquisition unit 48 acquires, from the external sensor 22, three-dimensional data such as image data of the surroundings of the vehicle 12 and unevenness of the road surface on which the vehicle 12 travels, as vehicle travel state information indicating the travel state of the vehicle 12. Various types of information acquired from the external sensor 22 by the vehicle external information acquisition unit 48 are sent to the data server 16 via the communication unit 44.

The vehicle internal information acquisition unit 50 acquires time-series data of the wheel speed of the wheel 12A in the vehicle 12 (wheel speed time-series information), time-series data of the longitudinal acceleration and the lateral acceleration of the vehicle 12, time-series data of the yaw rate, time-series data of the steering angle, time-series data of the accelerator operation amount, and time-series data of the brake operation amount from the internal sensor 24 as the vehicle travel state information of the vehicle 12. Various types of information acquired by the vehicle internal information acquisition unit 50 from the internal sensor 24 are sent to the data server 16 via the communication unit 44.

The travel route setting unit 52 sets the travel route of the vehicle 12 based on the location information of the vehicle 12, the destination of the vehicle 12 input by an input device (not shown), and the map information. The travel route setting unit 52 sends the location information and travel route of the vehicle 12 to the data server 16 via the communication unit 44.

The actual weather condition information generation unit 54 generates actual weather condition information indicating the weather condition around the road on which the vehicle 12 travels based on the vehicle weather condition information acquired by the vehicle weather information acquisition unit 46 and the vehicle travel state information acquired by the vehicle external information acquisition unit 48 and the vehicle internal information acquisition unit 50. The actual weather condition information generation unit 54 is configured to send the actual weather condition information to the data server 16 via the communication unit 44, and to acquire the actual weather information of an arbitrary vehicle 12 via the communication unit 44.

Specifically, in the present embodiment, as an example, data in which the location information of the vehicle 12, the satellite image data around the vehicle 12, and the image data of the surroundings of the vehicle 12 by the external sensor 22 are associated with each other is set as the actual weather condition information. Note that the vehicle 12 includes a monitor (not shown), and an occupant of the vehicle 12 can confirm actual weather information of an arbitrary vehicle 12 using the monitor.

Figure 3:
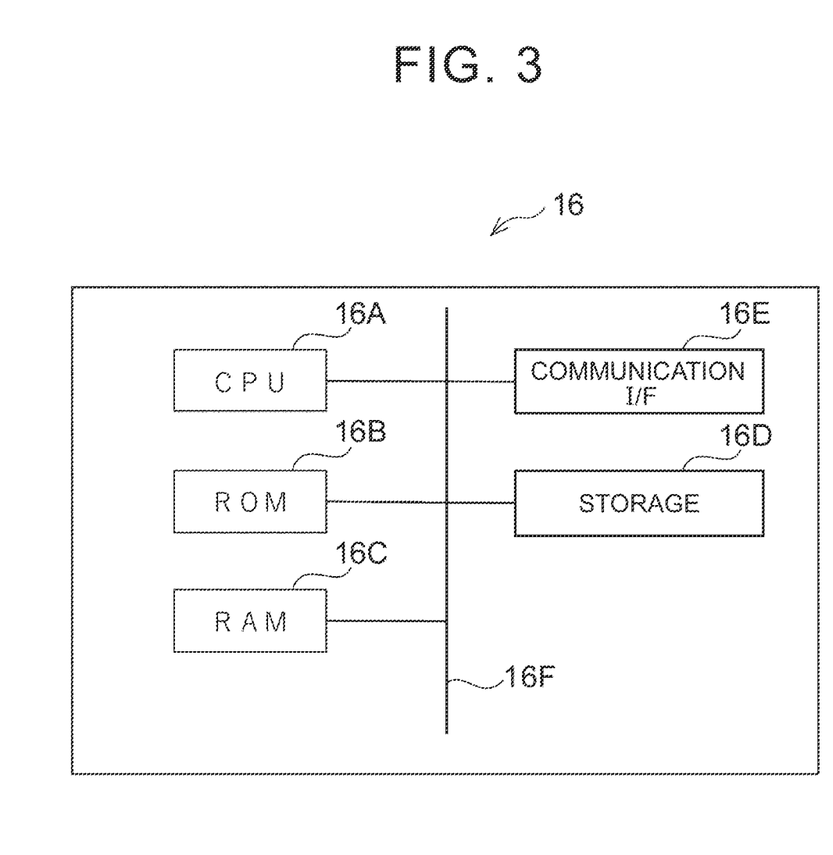
FIG. 3 is a block diagram illustrating a hardware configuration of a data server in the vehicle situation estimation system according to the present embodiment.

Next, the configuration of the data server 16 will be described with reference to FIG. 3. The data server 16 includes a "CPU 16A" as a processor, a ROM 16B, RAM 16C, a storage 16D, and a communication I/F 16E. CPU 16A, ROM 16B, RAM 16C, the storage 16D, and the communication I/F 16E are communicably connected to each other via a bus 16F. CPU 16A, ROM 16B, RAM 16C storage 16D and the communication I/F 16E have basically the same functions as those constituting the above-described vehicle control device 14. Further, the storage 16D stores information sent from the satellite 18, information sent from the vehicle control device 14, a weather estimation model for estimating the weather of a predetermined area, and a road condition estimation model for estimating the condition of the road, as will be described later. Then, the execution program stored in ROM 16B is read and executed by CPU 16A, so that the data server 16 can perform various functions.

Figure 4:
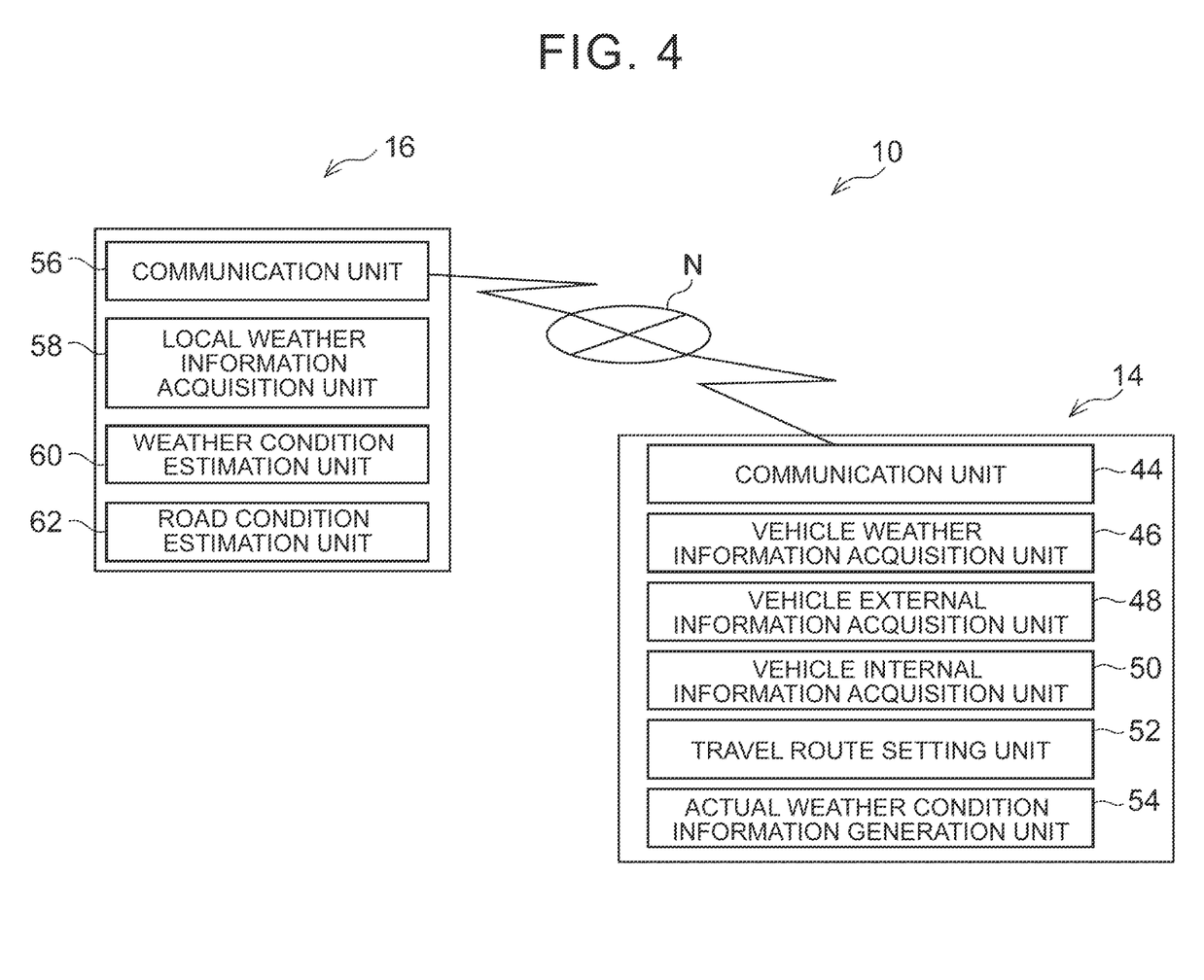
FIG. 4 is a block diagram illustrating a functional configuration of the vehicle situation estimation system according to the present embodiment.

Specifically, as illustrated in FIG. 4, the data server 16 functions as an aggregate of the communication unit 56, the "local weather information acquisition unit 58", the "weather condition estimation unit 60", and the "road condition estimation unit 62".

The communication unit 56 is configured to send and receive various kinds of information to and from the vehicle control device 14 and the artificial satellite 18.

The local weather information acquisition unit 58 acquires weather information of a predetermined area, that is, satellite image data of the predetermined area, from the artificial satellite 18 as local weather information.

When the travel route of the other vehicle 12 includes the predetermined area, the weather condition estimation unit 60 estimates the weather around the other vehicle 12 when the other vehicle 12 travels in a predetermined area, based on the actual weather condition information of one vehicle 12 that travels in the predetermined area, the local weather information of the area, and the travel route of the other vehicle 12. The weather condition estimation unit 60 sends the weather information of this region estimated by the weather condition estimation unit 60 to the vehicle control device 14 of the other vehicle 12 via the communication unit 56.

Specifically, the weather condition estimation unit 60 inputs the actual weather condition information of one vehicle 12 and the local weather information of a predetermined area in which the vehicle 12 is located to the weather estimation model, thereby outputting the weather (such as sunny weather or rain) of this area.

As an example, the weather estimation model is a machine-learned model learned according to a machine learning technique such as a convolutional neural network using a set of satellite image data at a predetermined time point in a predetermined area, image data around the vehicle 12 at this time, and data of weather (sunny weather, rain, and the like) in a predetermined area at this time as training data.

The road condition estimation unit 62 estimates the road surface condition of the road on which the vehicle 12 travels on the basis of the wheel speed time-series information of the vehicle 12 that travels in a predetermined area acquired from the vehicle control device 14 and the local weather information of the area.

Specifically, the road condition estimation unit 62 inputs the wheel speed time-series information of the vehicle 12 that travels in the predetermined area and the local weather information of the predetermined area to the road condition estimation model, so as to output the road surface condition of the road in this area (the degree of unevenness, the coefficient of friction, and the like).

The road condition estimation model is a machine-learned model learned in accordance with a machine learning technique such as a convolutional neural network by using, as training data, a set of wheel speed time-series information of the vehicle 12 when the vehicle 12 is traveling on a predetermined travel route in a predetermined area, satellite image data of a predetermined area at this time, a height distribution measured by a rider on a road surface of the travel route at this time, and data of a friction coefficient on a road surface of the travel route at this time.

The road condition estimation unit 62 can also output the friction coefficient of the road surface on which the vehicle 12 travels by inputting the acceleration information, steering amount information, accelerator operation amount information, brake operation amount information of the vehicle 12 and the location information of the vehicle 12 when the vehicle 12 is traveling for a predetermined time into the road condition estimation model.

That is, the road condition estimation model has been machine-learned using as training data a set of data for the acceleration information of vehicle 12, the steering amount information, accelerator operation amount information, brake operation amount information, displacement amount of the vehicle 12 when the vehicle 12 is traveling for a predetermined time under a predetermined condition (dry or freezing condition) and the friction coefficient of the road surface of the test running road.

When receiving a predetermined request signal from the vehicle control device 14 via the communication unit 56, the road condition estimation unit 62 sends information on the road surface condition of the road on which the arbitrary vehicle 12 travels to the vehicle control device 14.

OPERATION AND EFFECT OF THE PRESENT EMBODIMENT

Next, operations and effects of the present embodiment will be described.

Figure 5:
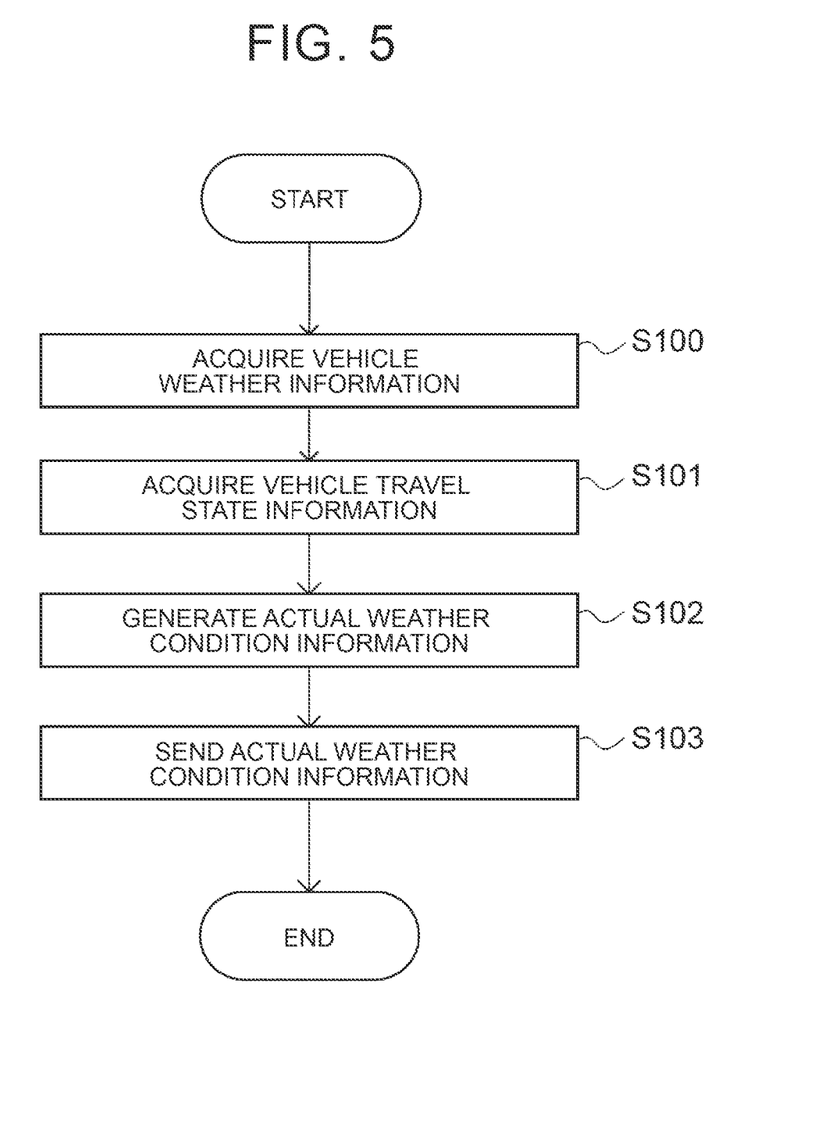
FIG. 5 is a flow chart showing a flow of a process performed by the vehicle control device in the vehicle situation estimation system according to the present embodiment.

Hereinafter, an example of a control flow of the vehicle control device 14 will be described mainly with reference to a flowchart illustrated in FIG. 5.

When this control flow is started, in S100, CPU 14A of the vehicle control device 14 acquires the vehicle weather information from the satellite 18.

In S101, CPU 14A acquires vehicle travel state information from the external sensor 22 and the internal sensor 24.

In S102, the CPU 14A generates actual weather condition information indicating the weather condition around the road on which the vehicle 12 travels based on the vehicle weather information and the vehicle travel state information.

In S103, CPU 14A sends the actual weather condition information to the data server 16 and terminates the control flow.

Therefore, in the present embodiment, by sharing the actual weather condition information in the plurality of vehicles 12 via the data server 16, it is possible to obtain the weather condition around the predetermined vehicle 12.

Figure 6:
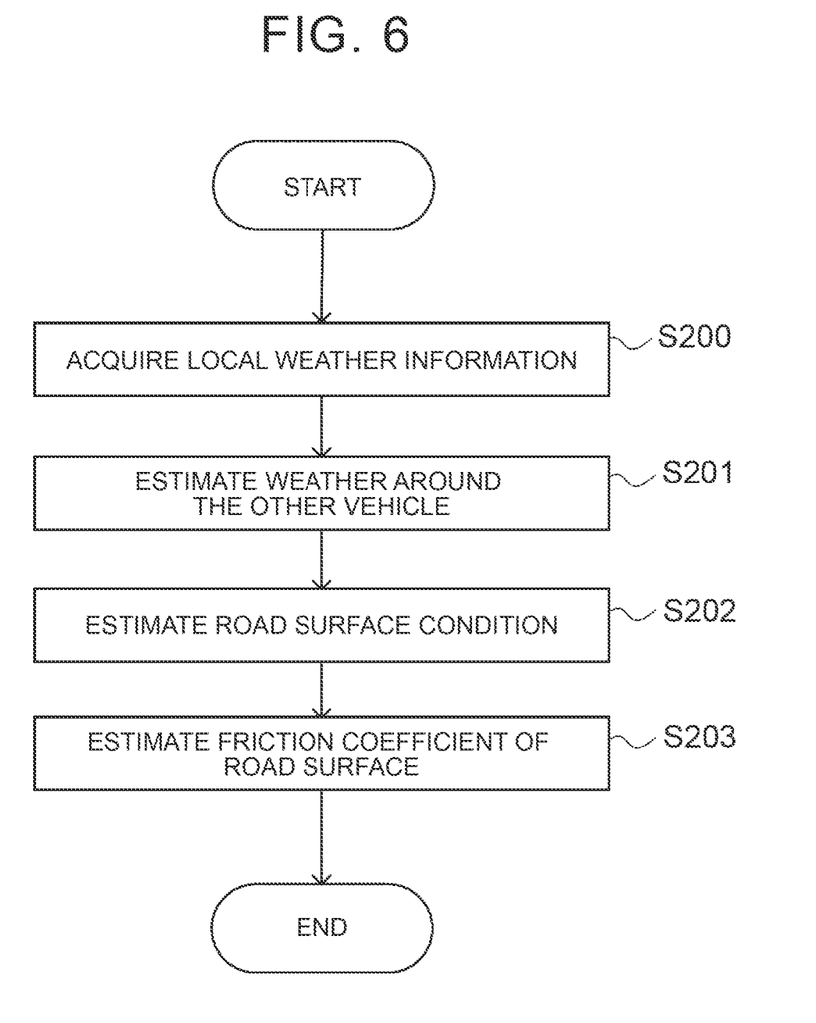
FIG. 6 is a flowchart illustrating a flow of processing by the data server in the vehicle situation estimation system according to the present embodiment.

Next, an example of a control flow of the data server 16 will be described mainly using the flowchart shown in FIG. 6.

In S200, CPU 16A obtains local weather information of a predetermined area from the satellite 18.

In S201, when the predetermined area is included in the travel route, the CPU 16A estimates the weather around the other vehicle 12 when the other vehicle 12 travels in the predetermined area, based on the actual weather condition information of one vehicle 12 that travels in the predetermined area, the local weather information of the area, and the travel route of the other vehicle 12.

In S202, CPU 16A estimates the road surface condition of the road on which the vehicle 12 travels, that is, the degree of unevenness and the frictional coefficient of the road surface on the basis of the wheel speed time-series information of the vehicle 12 that travels in a predetermined area acquired from the vehicle control device 14 and the local weather information of the area.

In S203, CPU 16A estimates the frictional coefficient of the road surface of the road on which the vehicle 12 travels based on the acceleration information, steering amount information, accelerator operation amount information, and brake operation amount information of the vehicle 12 and the location information of the vehicle 12 when the vehicle 12 is traveling for a predetermined time, and ends the control flow.

Therefore, in the present embodiment, the accuracy of the estimation of the weather around the vehicle 12 can be ensured by sharing the actual weather condition information between or among the plurality of vehicles 12.

Further, in the present embodiment, it is possible to improve the accuracy of the estimation of the road surface condition of the road on which the vehicle 12 travels.

As described above, in the present embodiment, it is possible to improve the accuracy of various pieces of information on the weather around the vehicle 12.

In the above-described embodiment, the road condition estimation unit 62 estimates the road surface condition of the road on which the vehicle 12 travels by using the road condition estimation model, but the road condition estimation unit 62 may estimate the road surface condition of the road by a method different from this. For example, the road condition estimation unit 62 may estimate the road surface condition of the road from the similarity between the time-series sample data of the wheel speed when the vehicle 12 was traveling on a predetermined road on a clear day and the time-series data of the wheel speed when the vehicle 12 is actually traveling on the road.

What is claimed is:

1. A vehicle situation estimation system comprising:
a processor configured to:
acquire vehicle weather information on weather around a first vehicle from an artificial satellite;
acquire vehicle travel state information from a sensor mounted on the first vehicle, the sensor being configured to detect a travel state of the first vehicle;
generate, based on the first vehicle weather information and the first vehicle travel state information, actual weather condition information indicating a weather condition around a road on which the first vehicle travels;
acquire, as part of the first vehicle travel state information, an image or video of surroundings of the first vehicle captured by an imaging device;
acquire local weather information of a predetermined area from the artificial satellite;
determine a travel route of a second vehicle based on location and destination information;
determine whether the predetermined area is included in the travel route of the second vehicle;
estimate, when the predetermined area is included in the travel route of the second vehicle, a weather condition around the second vehicle when the second vehicle travels in the predetermined area, based on the actual weather condition information of the first vehicle that travels in the predetermined area, the local weather information, and the travel route of the second vehicle; and
transmit the estimated weather condition around the second vehicle when the second vehicle travels in the predetermined area from the first vehicle to the second vehicle.

2. The vehicle situation estimation system according to claim 1, wherein the processor is further configured to:
acquire wheel speed time-series information of the first vehicle as part of the first vehicle travel state information;
estimate a road surface condition of the road on which the first vehicle travels, based on the acquired wheel speed time-series information and the local weather information of the predetermined area; and
transmit information on the estimated road surface condition to the second vehicle.

3. The vehicle situation estimation system according to claim 2, wherein the processor is configured to;
acquire acceleration information, steering amount information, accelerator operation amount information, and brake operation amount information of the first vehicle as the first vehicle travel state information;
estimate a friction condition of the road surface of the road based on vehicle location information and the first vehicle travel state information, the first vehicle location information being information based on a location signal of the first vehicle sent from the artificial satellite; and transmit information on the estimated friction condition to the second vehicle.

4. A vehicle situation estimation method comprising:

acquiring vehicle weather information on weather around a first vehicle from an artificial satellite;

acquiring vehicle travel state information from a sensor mounted on the first vehicle, the sensor being configured to detect a travel state of the first vehicle;

generating, based on the first vehicle weather information and the first vehicle travel state information, actual weather condition information indicating a weather condition around a road on which the first vehicle travels;

acquiring, as part of the first vehicle travel state information, an image or video of surroundings of the first vehicle captured by an imaging device;

acquiring local weather information of a predetermined area from the artificial satellite;

determining a travel route of a second vehicle based on location and destination information;

determining whether the predetermined area is included in the travel route of the second vehicle;

estimating, when the predetermined area is included in a travel route of a second vehicle, a weather condition around the second vehicle when the second vehicle travels in the predetermined area, based on the actual weather condition information of the first vehicle that travels in the predetermined area, the local weather information, and the travel route of the second vehicle; and transmitting the estimated weather condition around the second vehicle when the second vehicle travels in the predetermined area from the first vehicle to the second vehicle.

5. A non-transitory storage medium storing a vehicle situation estimation program that, when executed by a processor, causes the processor to:

acquire vehicle weather information on weather around a vehicle from an artificial satellite;

acquire vehicle travel state information from a sensor mounted on the vehicle, the sensor being configured to detect a travel state of the vehicle;

generate, based on the vehicle weather information and the vehicle travel state information, actual weather condition information indicating a weather condition around a road on which the vehicle travels;

acquire, as part of the vehicle travel state information, an image or video of surroundings of the vehicle captured by an imaging device;

acquire local weather information of a predetermined area from the artificial satellite;

determine a travel route of a second vehicle based on location and destination information;

determine whether the predetermined area is included in the travel route of the second vehicle;

estimate, when the predetermined area is included in a travel route of a second vehicle, a weather condition around the second vehicle when the second vehicle travels in the predetermined area, based on the actual weather condition information of the first vehicle that travels in the predetermined area, the local weather information, and the travel route of the second vehicle; and transmit the estimated weather condition around the second vehicle when the second vehicle travels in the predetermined area from the first vehicle to the second vehicle.

* * * * *